United States Patent [19]

Nakamura

[11] 4,279,281
[45] Jul. 21, 1981

[54] AUTOMATIC BRANCH CUT-OFF DEVICE

[75] Inventor: Hiroshi Nakamura, Tokyo, Japan

[73] Assignee: Shinko Plant Co. Ltd., Tokyo, Japan

[21] Appl. No.: 84,920

[22] Filed: Oct. 15, 1979

[30] Foreign Application Priority Data

May 25, 1979 [JP] Japan .................. 54-64657

[51] Int. Cl.³ .......................................... A01G 23/02
[52] U.S. Cl. .............................. 144/2 Z; 144/309 AC
[58] Field of Search ............... 144/2 Z, 208 R, 208 E, 144/309 AC

[56] References Cited

U.S. PATENT DOCUMENTS

| 2,477,922 | 8/1949 | Emery et al. | 144/2 Z |
|---|---|---|---|
| 2,482,392 | 9/1949 | Whitaker | 144/2 Z |
| 2,583,971 | 1/1952 | Shuff | 144/2 Z |
| 3,030,986 | 4/1962 | Longert | 144/2 Z |
| 3,181,578 | 5/1965 | Longert | 144/2 Z |
| 3,356,113 | 12/1967 | Perugia | 144/2 Z |
| 3,364,962 | 1/1968 | Otterbach et al. | 144/2 Z |
| 3,451,448 | 6/1969 | Michener | 144/2 Z |
| 3,454,058 | 7/1969 | Fend | 144/2 Z |
| 3,545,509 | 12/1970 | Baxter, Jr. | 144/2 Z |

FOREIGN PATENT DOCUMENTS

| 45-27370 | 9/1970 | Japan | 144/2 Z |
|---|---|---|---|
| 53-124399 | 10/1978 | Japan | 144/2 Z |

Primary Examiner—W. D. Bray
Attorney, Agent, or Firm—Armstrong, Nikaido, Marmelstein

[57] ABSTRACT

An automatic branch cutting device is disclosed comprising a frame which is capable of being divided into two halves, a branch cutting tool, an elevating means for ascending and descending a tree trunk, an ascending and descending transfer clutch, an engine and a drive means for transferring the movement from the engine to each of the moving parts. The branch cutting tool is preferably a chain saw which will cut off tree branches while revolving on a rotary ring by an engine. The elevating means drives the whole device upward by combining two links, which are equal in length, pantagraphically with a link fitted therewith parallel to the tree trunk. Rollers are fitted with a flexible material on their surfaces at connecting points of the links. By means of a spring, the tip of the parallel link is pushed from the side of the frame to the side of the tree trunk. This spring automatically exerts a component of force to press the rollers against the trunk of a tree by positioning the center of gravity of the side of the frame outside the rollers. The elevating means has a drive mechanism containing a friction clutch by which the speed of revolution and the ascending speed are lowered automatically while a branch is being cut. The drive means automatically reverses the revolution by means of the transfer clutch when the cutting of the branches is complete and then drives the whole device downward.

3 Claims, 5 Drawing Figures

AUTOMATIC BRANCH CUT-OFF DEVICE

BACKGROUND OF THE INVENTION

1. Field of the Invention

This invention relates to an automatic branch cut-off device. More particularly, the invention relates to an automatic branch cut-off device which is attached onto the trunk of a tree at its base, and which is automatically driven upwardly in order to cut off the lower branches of the tree while the machine is in a revolving helical type of movement. After the branches have been removed, the direction of movement of the mechanism can be changed by a transfer clutch and the device driven downwardly.

2. Description of the Prior Art

There are basically two situations where the lower branches of a tree are to be removed. One situation is where they are obstructive to the removal of the tree when the tree is being cut down and, consequently, the lower branches are cut off prior to the tree being cut down. This is called "disbranching". The second situation is where the lower branches may be cut off during a period of growth. This is called "pruning", and it is done in order that the tree may grow straight and without any knots. The former situation of disbranching is concerned with trees of a relatively large size, while pruning is concerned with trees of a generally small size.

Previously, cutting the lower branches off of a tree was often performed by an individual who had to climb the tree in order to cut the branches, and use a saw, hatchet or the like for the cutting operation. In either disbranching or pruning, cutting was carried out either by a machine tool or was done manually.

Conventional devices and methods for cutting off lower tree branches as discussed above contained several disadvantages. In manually operated cutting, the possibility exists that cut branches may fall and injure the operator. In addition, it is usually not possible to cut off the lower branches at a height sufficient to obtain the desired results. Prior art pruning methods are undesirable, especially when pruning branches during a growth period.

Accordingly, it has become necessary to develop a mechanical device which would prove suitable and which would eliminate the disadvantages inherent in the prior art devices. One attempt to produce such a device is shown in Japanese patent publication no. 27370/1970. The invention disclosed in this application relates to a device which is driven upwardly on a tree trunk by means of a guide pulley which ascends and descends the tree trunk helically. The ascendant speed is varied by means of a speed change gear in order to cut off the branches. However, this device is unable to operate if the tree surface is not uniformly smooth. Also, it does not contain a means for driving the device down after the branches are cut off the tree.

The inventor of the subject invention has developed an invention which is directed to an automatic branch cut-off device which overcomes the above-noted disadvantages. As a result of extensive research, this present invention has been developed, which improves its elevating means with a simplified mechanism.

SUMMARY OF THE INVENTION

Accordingly, it is an object of the present invention to provide an automatic branch cutting device which can perform the cutting off of lower tree branches so precisely that no part of the branch will remain on the surface of the tree trunk, regardless of the size of the tree.

Another object of the present invention is to provide an automatic branch cutting device which can be driven downwards freely, as well as upwards, on the trunk of a tree, ranging from the larger diameter at the base of the tree trunk to the smaller diameter at the tree top, in order to cut off the branches of the tree in a uniform manner by utilizing an effectively operated elevating means.

Still another object of the present invention is to provide an automatic branch cutting device which can be driven downwardly automatically by means of a switchable transfer clutch after the cutting operation has been completed.

Yet another object of the present invention is the provision of an automatic branch cutting device which not only saves manpower, but also improves safety since the cutting operation is fully automatic, with the exception of the device being first placed on the tree at the base of the trunk manually and that the string of the transfer clutch is pulled manually.

These and other objects of the present invention will become apparent to persons skilled in the art upon reading the details of construction and useage as are more fully set forth below. Reference is hereby made to the accompanying drawings forming a part hereof, wherein like numerals refer to like parts throughout.

BRIEF DESCRIPTION OF THE DRAWINGS

One embodiment of the device of the present invention is shown in FIGS. 1-5.

DESCRIPTION OF THE PREFERRED EMBODIMENTS

Prior to describing the automatic branch cutting device of this invention, it is to be understood that this invention is not intended to be limited to the particular arrangement of parts shown as such devices may, of course, vary. It is also to be understood that the terminology used herein is for the purpose of describing only particular embodiments, and it is not intended to be limiting, since the spirit and scope of the present invention are limited only by the appended claims.

Figure 1:
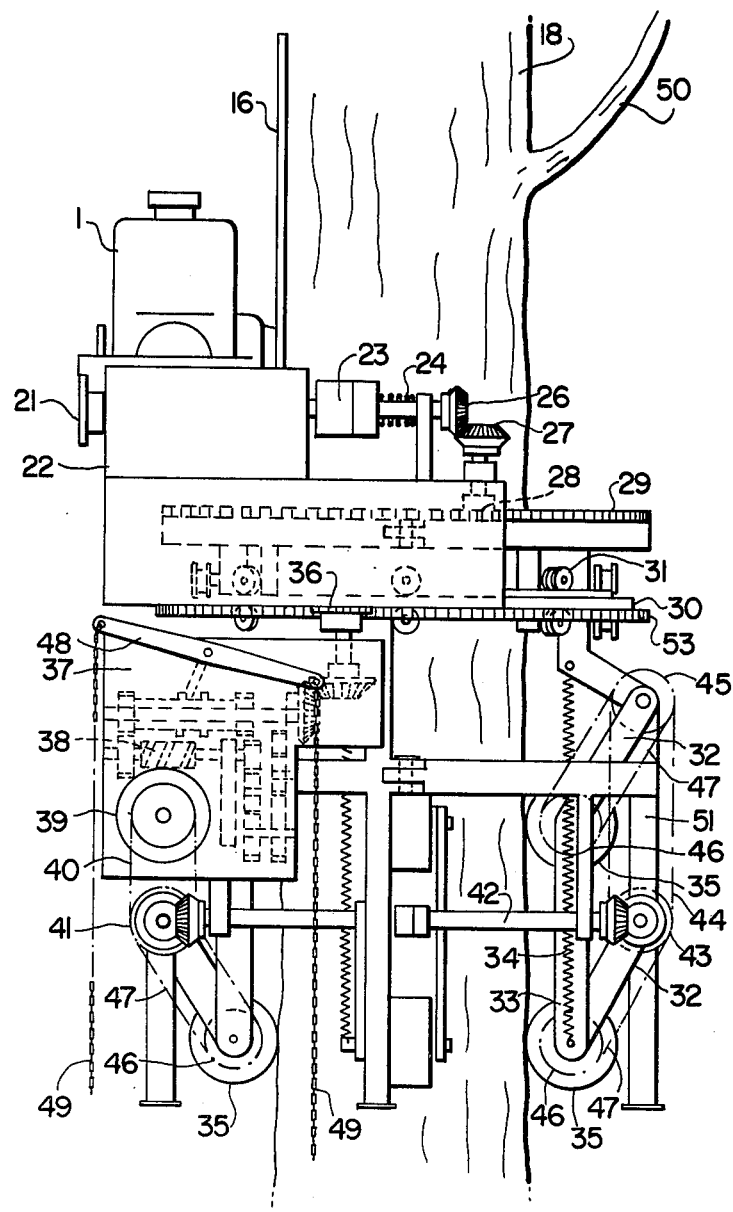
FIG. 1 is a front view of an automatic branch cutting device of this invention.
Figure 2:
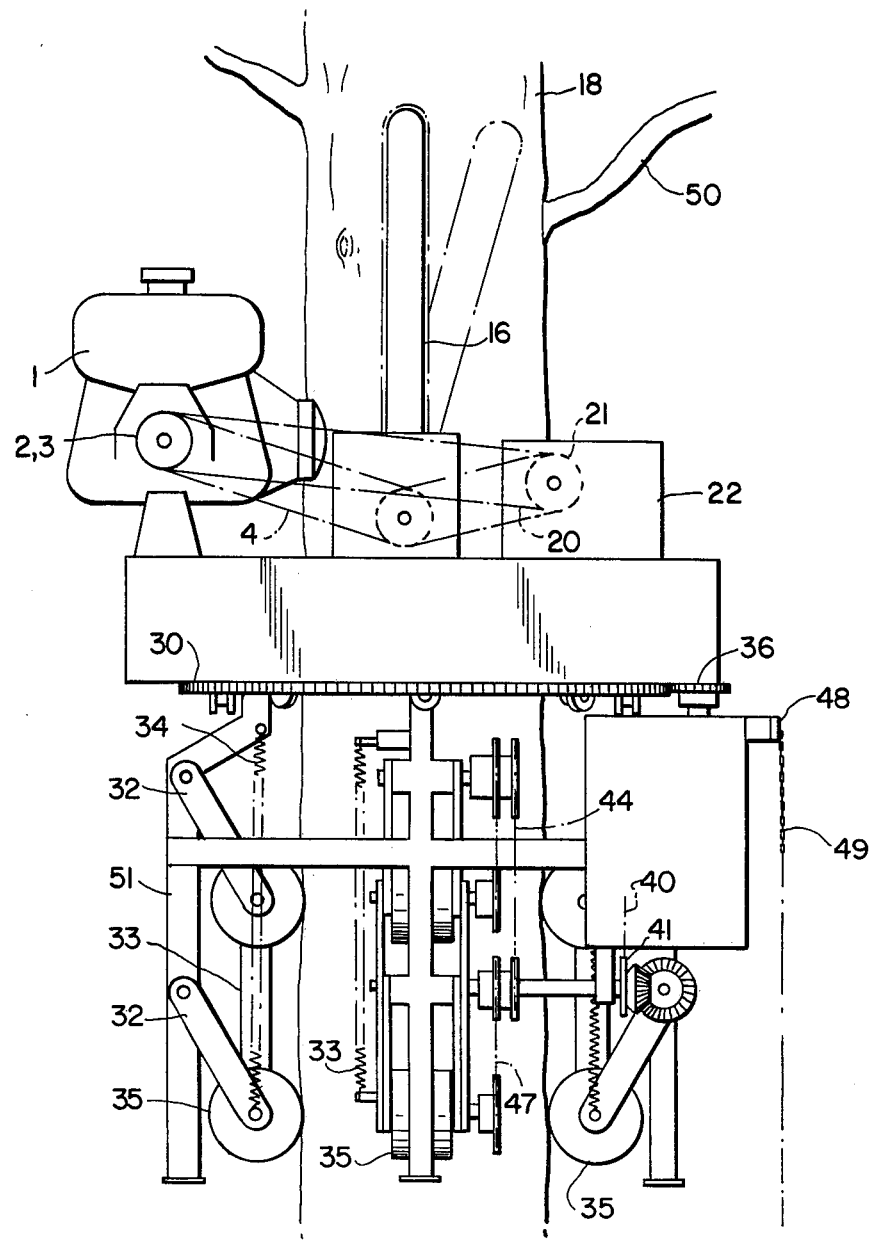
FIG. 2 is a side view of an automatic branch cutting device of this invention.
Figure 3:
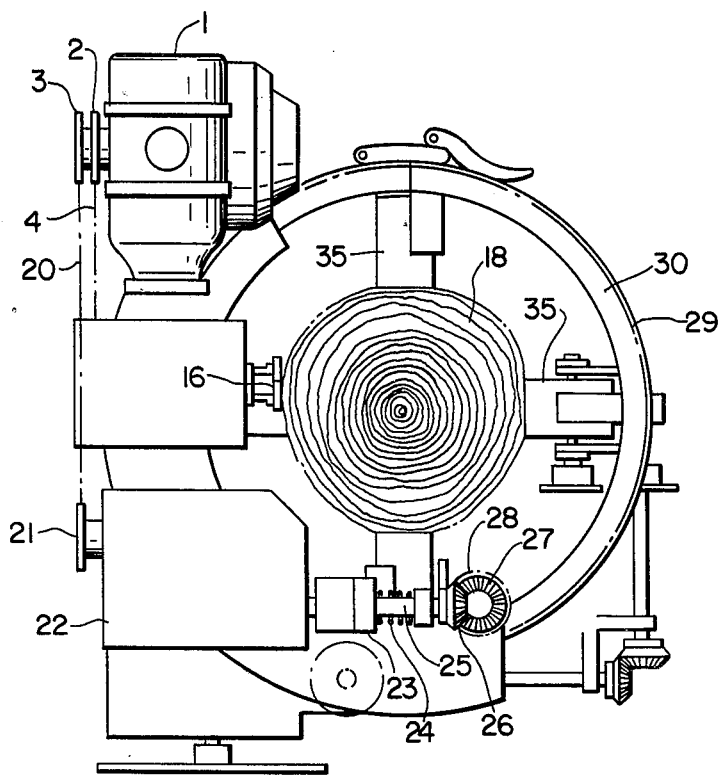
FIG. 3 is a plan view of an automatic branch cutting device of this invention.
Figure 4:
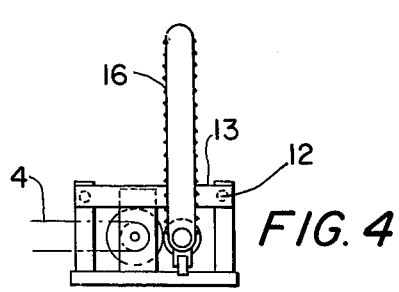
FIG. 4 is a detailed side view around the chain saw of the automatic branch cutting device as seen from section lines IV—IV of FIG. 5.

FIG. 1 is an elevational view of the device of the present invention. A revolving cutting means comprises chain saw 16, engine 1, rotary gear 30, and associated gearing. The chain saw 16 is driven by an engine 1 through a chain 4, a chain wheel 5, and a chain wheel 2. Separately therefrom, a reduction in speed is made by a chain wheel 3, a chain 20, a further gear 21 and a gear box 22 to a clutch 23. The revolving part including the engine 1 and the chain saw 16, is mounted on a rotary ring 30 and is revolved by meshing a pinion 28 with a fixed gear 29 on a frame 51. Accordingly, the saw 16 is able to revolve around the periphery of the tree trunk 18. This cutting means is supported on the frame 51 through rollers 31.

The elevating means is composed of rollers 35, 35', frame 51, associated driving means, springs 34, and links 32 and 33 which are pantagraphically interconnected. The links 32 and 32' are of the same length, and the distance between the shafts on the frame is the same as the distance between shafts of link 33. The rollers of the elevating means are rotated to drive the entire mechanism upwards, as well as being able to drive it downwards.

The surface of each ascending and descending roller 35 is made of a flexible material with some self-adhesive property. The rollers 35 and 35' are pushed against the side of the trunk of a tree by means of a spring 34 fitted to a tip of link 33 from the side of frame 51. The center of gravity of the side of the frame is positioned outside the roller, so that a component of the gravity force is exerted automatically thereon to cause roller 35 to be pushed on the trunk 18 of a tree. The frictional force between the trunk 18 and rollers 35 and 35' supports the entire mechanism and prevents the whole invention from falling down.

Figure 5:
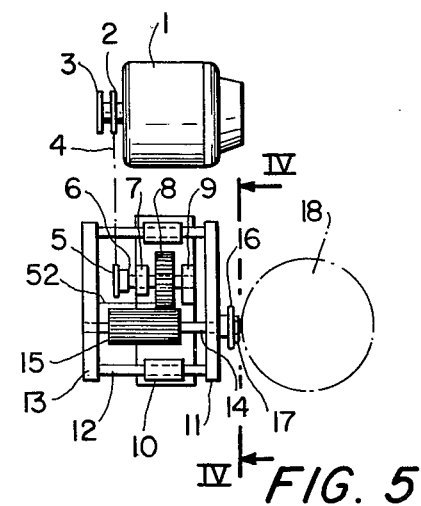
FIG. 5 is a detailed plan view around the chain saw of the automatic branch cutting device.

In FIGS. 1–5, the engine 1 drives the chain wheel 5 by means of the chain 4 connected to the chain wheel 2 on engine 1. This rotates a shaft 6. The gear 15 is driven by the gear 8, and the chain saw 16 is rotated through the shaft 14 as seen in FIG. 5. The chain saw 16 is fitted with a member 13 shown in FIG. 4. The saw 16 is fitted with a member 11 through a slide shaft 12. A bearing 10 for the slide shaft 12 is shown in FIG. 5. The gear 15 has a broad teeth width so as to be able to slide, thus enabling the chain saw 16 to be pushed in the radial direction of the trunk of a tree depending on the size of the tree trunk. The members 13 and 11 are pulled together towards trunk 18 by means of a spring 52. The cutting means is thus biased in the radial direction of the tree trunk and presses caster 17 onto the surface of the tree trunk caster 17 keeps a constant gap between the trunk 18 of a tree and the chain saw 16.

The branches, which are not cut off in a given revolution about the trunk by the cutting means, can be cut on the next turn of revolution because the position of the chain saw 16 is raised at that time.

A friction clutch 23 is mounted between a reduction gear box 22 and the remainder of the revolving cutting means. The clutch 23 is pressed thereon by a spring 24. The clutch slips when the resistance of the revolving cutting means, as well as the elevating means, is increased.

The rotary power produced on the shaft 25 results in rotation of pinion 28 in the perpendicular direction to shaft 25 through bevel gears 26 and 27. Accordingly, the chain saw part including the engine 1 revolves around the fixed gear 29. A rotary ring 30 has the gear 53 mounted thereon. The revolution of the rotary ring 30 causes rotation of the pinion 36 meshing with the gear 53 mounted on the ring. Accordingly, the above rotation is transferred to the transfer clutch 37 through the bevel gears, and is further transferred to the elevating means through the shaft 42 of the drive means.

The lower end of a string 49 (which is long enough for the device to be able to reach the desired height) is connected to lever 48 and is connected to the ground. As soon as the device reaches the desired height, the stretch of the string pulls the lever 48 to enable the device to be transferred and driven downward.

The above explanation was provided for the case of only one engine being used. However, in another embodiment of this invention, two engines may be used. One is used for the power transmission to the cut-off means and includes a chain saw and the like, as well as the revolving cutting means mentioned above. The other engine is used for the elevating means. In the latter case, the rotary power may be transferred from the newly installed engine directly to the elevating means through the transfer clutch 37. This transfer does not require either the gear 53 or the pinion 36. This is also true of the transfer clutch where only one engine is used and the elevating means follows thereafter.

The fixed gear 29 and the pinion 28, or the rotary gear 53 and the pinion 36, may be replaced by a chain and a chain wheel, respectively. The chain may be of such a type as may be fitted with a ring.

As noted above, the device of this invention is of such a type that a chain saw is set with an engine which revolves itself. While the branches of a tree are being cut, the speed of revolution, as well as the ascending speed, are lowered by the frictional force which causes slipping of the friction clutch. When the cutting off is complete, the speed is automatically increased to cause the device to revolve while ascending. However, the chain saw itself continues to revolve at a predetermined high speed.

This invention may be applied to the disbranching of a large size tree, as well as to the pruning of a small tree during a growth period by an optional selection of the diameter of the frame. This adaptability makes the device of this invention extremely advantageous from an economical viewpoint, as well as from the standpoints of workability and safety. The device of this invention may also be applied to picking fruit from a tall tree (such as a palm tree), by the use of a special cutter being used rather than a chain saw.

The instant invention has been shown and described in what is believed to be the most practical, as well as the most preferred, embodiment thereof. It is recognized, however, that departures may be made therefrom which are within the scope of the invention and that obvious modifications will occur to those persons of ordinary skill in the art.

What is claimed:

1. An automatic branch cut-off device comprising:
   a frame adapted to be divided into two halves to surround a tree trunk and including a circular fixed ring gear;
   an elevating means connected to said frame for moving said frame upwardly and downwardly on the trunk;
   means for powering said elevating means;
   revolving cutting means including a rotary ring, means for mounting the rotary ring on said frame which comprises rollers, an engine mounted on said rotary ring, a cutting tool mounted on said rotary ring, means for drivingly connecting said engine to said cutting tool, and a first pinion gear being rotatably mounted on said rotary ring and drivingly connected to said engine, said first pinion meshing with said fixed ring gear to revolve said cutting means about the periphery of the tree trunk;
   transfer clutch means engaged with said means for powering said elevating means for reversing the direction of movement of the entire device upwardly or downwardly;

said elevating means comprising:
  an upper link having opposite ends and being pivotally attached to said frame on one of said ends of said upper link;
  a lower link having opposite ends and being pivotally attached to said frame on one of said ends of said lower link;
  a connecting link parallel to said frame pantographically, pivotally interconnecting the other end of said upper link to the other end of said lower link, said connecting link having a length, said lower link being attached to said frame at a distance below where said upper link is attached equal to said length;
  rollers fitted with a flexible material on the surface thereof, said rollers being rotatably mounted at the points where said connecting link interconnects with said upper link and said lower link; and
  a spring connected between said connecting link and said frame pushing a top of said connecting link from a side of said frame to a side of the trunk of the tree, thereby automatically exerting a component of a force to press said rollers against the trunk of the tree by positioning the center of gravity of said side of said frame outside said rollers.

2. An automatic branch cut-off device as in claim 1 wherein said means for powering comprises:
  a second pinion mounted on said frame and being intermeshed with said rotary ring; and means for driving said rollers mounted on said frame operatively associated with said second pinion;
  whereby said elevating means is driven by the resulting rotary power.

3. An automatic branch cut-off device as in any one of claims 2 or 1 wherein said cutting tool is a chain saw.

* * * * *